United States Patent [19]

Ikeda et al.

[11] Patent Number: 5,011,226
[45] Date of Patent: Apr. 30, 1991

[54] HEADREST

[75] Inventors: Tetsuo Ikeda; Akira Nemoto, both of Akishima, Japan

[73] Assignee: Tachi-S Co., Ltd., Tokyo, Japan

[21] Appl. No.: 461,518

[22] Filed: Jan. 5, 1990

[51] Int. Cl.⁵ .................................................. A47C 1/10
[52] U.S. Cl. ....................................... 297/403; 297/391
[58] Field of Search ............... 297/403, 408, 409, 361, 297/284, 391

[56] References Cited

U.S. PATENT DOCUMENTS

| | | | |
|---|---|---|---|
| 2,976,915 | 3/1961 | Spound | 297/403 X |
| 4,807,934 | 2/1989 | Sakakibara | 297/408 X |
| 4,834,456 | 5/1989 | Barros et al. | 297/408 X |
| 4,923,250 | 5/1990 | Hattori | 297/408 X |

FOREIGN PATENT DOCUMENTS

| | | | |
|---|---|---|---|
| 2034832 | 7/1970 | Fed. Rep. of Germany | 297/408 |
| 62-7248 | 1/1987 | Japan . | |
| 62-75740 | 5/1987 | Japan . | |

*Primary Examiner*—Peter A. Aschenbrenner
*Attorney, Agent, or Firm*—Browdy and Neimark

[57] ABSTRACT

A headrest of a movable type, having a headrest body fixed via a stay to a shaft within a seat back. In such a headrest, the shaft is rotatably supported, and a motor is fixed within the seat back such that the motor is disposed at the lower part of the lateral side of the seat back and has a second sprocket. The second sprocket is connected via an endless chain with a first sprocket fixed on the shaft. Thus, the drive of the motor causes a fore-and-aft rotation of the headrest body whereby the headrest body is displaced between a use and non-use position, with repect to the seat back.

3 Claims, 3 Drawing Sheets

HEADREST

BACKGROUND OF THE INVENTION

1. Field of the Invention

The present invention relates to a headrest which is provided on the top of a seat back of a rear seat or an auxiliary seat next to a driver's seat associated with an automotive seat, and particularly relates to a movable headrest which is displaceable from a head support use position to a non-use position, to thereby permit a driver to attain a clear backward view field through the rear window of the automobile.

2. Description of Prior Art

Most ordinary headrests are located at the top of a front seat or rear seat and supported there by means what are generally called a stay for supporting the headrest, which generally forms a pair of stays.

The main purpose of the headrest is to ensure safety protection for the head of an occupant on the seat. But, the presence of such a headrest on the rear seat presents an obstacle against the backward view field of a driver on the front seat and prevents the driver from easily or safely steering the automobile to move backward. That is, when the driver turns his or her eyes backward to see the rear side of the automobile, the headrest on the rear seat becomes a hindrance against the backward view field of the driver and thus narrows that view field. Due to that reason, the driver feels it hard to safely steer the automobile backward.

Further, in driving the car, the forward view field needs also to be attained clearly for the driver, and in the case where an auxiliary seat is provided next to the driver's seat, the headrest on such auxiliary seat becomes now an obstacle against the driver's forward view field.

To solve the above-stated drawbacks, there has been proposed an improved headrest, as is known from the Japanese Laid-Open Utility Model Publication Nos. 62-7248 and 62-75740, for example.

According to those prior art, a motor is built in the seat back and the drive shaft of the motor is integrally fixed to a pinion gear which is in mesh with a sector gear. The sector gear is integral with the headrest stay, and therefore, a drive force of the motor is transmitted to those pinion and sector gears, which causes fore-and-aft rotation of the stay and thus the headrest. This is best disclosed from the U.M. Pub. No. 62-7248, and the other Pub. No. 62-75740 teaches a gear mechanism for causing the fore-and-aft rotation of the headrest. Thus, with those two prior art, the headrests is displaced from the use position where it rest upon the top of the seat back to the non-use position where it is located at a downward level, disappearing from the top of the seat back, so that the driver can attain a wide or unobstructed forward and backward view field, in both the rear seat and auxiliary seat.

However, both prior art are of such a structure that a motor is arranged within the seat back such that it is disposed at the upper part as well as at the central part of the seat back, and as a consequence thereof, the inward deflection of the cushion member of the seat back, which occurs when an occupant leans thereon, brings a deflected area of the seat back to contact with the motor, resulting thus in a hard strange and unpleasing touch on the occupant part. What is worse, the location of the motor at the upper part of the seat back gives a greater weight at that particular part of the seatback, which creates a non-stable state of the seat back.

SUMMARY OF THE INVENTION

With the above drawback in view, it is therefore a first purpose of the present invention to provide an improved headrest in which a motor for causing rotation of the headrest is located in a seat back at a point away from the central area of the seat back.

In accomplishment of the purpose, in accordance with the present invention, the motor is located in the seat back such that the motor per se is disposed at the lower part of the lateral side of the seat back. The headrest in the present invention further includes a pair of spaced-apart support brackets fixed within the seat back, a shaft which is rotatably extended between the pair of support brackets, a headrest body fixed via a stay on the shaft, a first sprocket fixed to the shaft, a second sprocket provided at the motor, and an endless chain extended over said first and second sprockets.

Accordingly, the drive force of the motor is transmitted through the endless chain to the shaft, thereby causing the fore-and-aft rotation of the headrest body relative to the seat back, and thus, the deflection of the seat back is normally effected without giving a hard strange or unpleasing touch to an occupant on the seat, which is found in the abovementioned prior art.

In one aspect of the invention, since the drive force of the motor is transmitted to the shaft only though the combination of the endless chain and tow sprockets, the number of transmitting elements is reduced and thus there is eliminated wobbling among those elements and an irregular rotation is almost completely avoided. Further, the engagement between the chain and two sprockets assures to avoid any wobble therein, so that the drive force of the motor is precisely transmitted to the shaft.

It is a second purpose of the present invention to permit a manual rotation of the headrest in such a case as a failure of the motor.

For that purpose, in accordance with the present invention, the first sprocket is connected via a torque limit means to the shaft. The torque limit means includes a pair of friction plates sandwiching the first sprocket therebetween. Normally, due to the frictional force of those friction plates, the shaft is rotated together with the first sprocket, but in such a case where the motor is out of order and the headrest is stopped at a non-use position forwardly of the seat back, an occupant may forcibly rotate the headrest and return to a use position upon the top of the seat back, using a force overcoming the frictional force of the two friction plates which is being exerted on the both sides of the first sprocket. This is because the shaft, to which is fixed the headrest body, is rotatable with respect to the first sprocket, and thus, upon application of a manual force to the headrest body, overcoming the frictional force of the torque limit means, the friction plates are slidable along both sides of the sprocket, permitting the forcible, manual rotation of the headrest body.

DETAILED DESCRIPTION OF PREFERRED EMBODIMENT OF THE INVENTION

Figure 1:
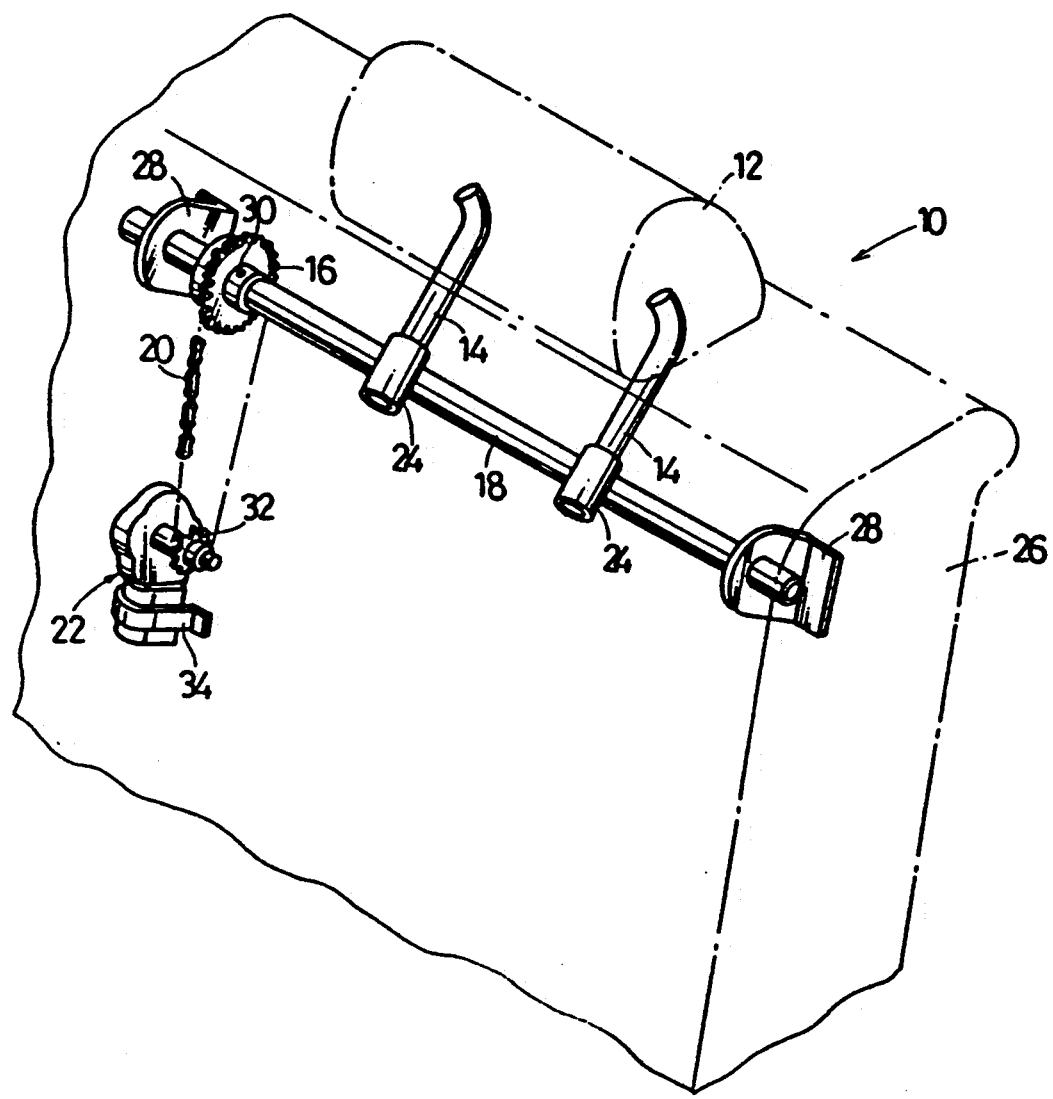
FIG. 1 is a schematic perspective view of a headrest in accordance with the present invention.
Figure 2:
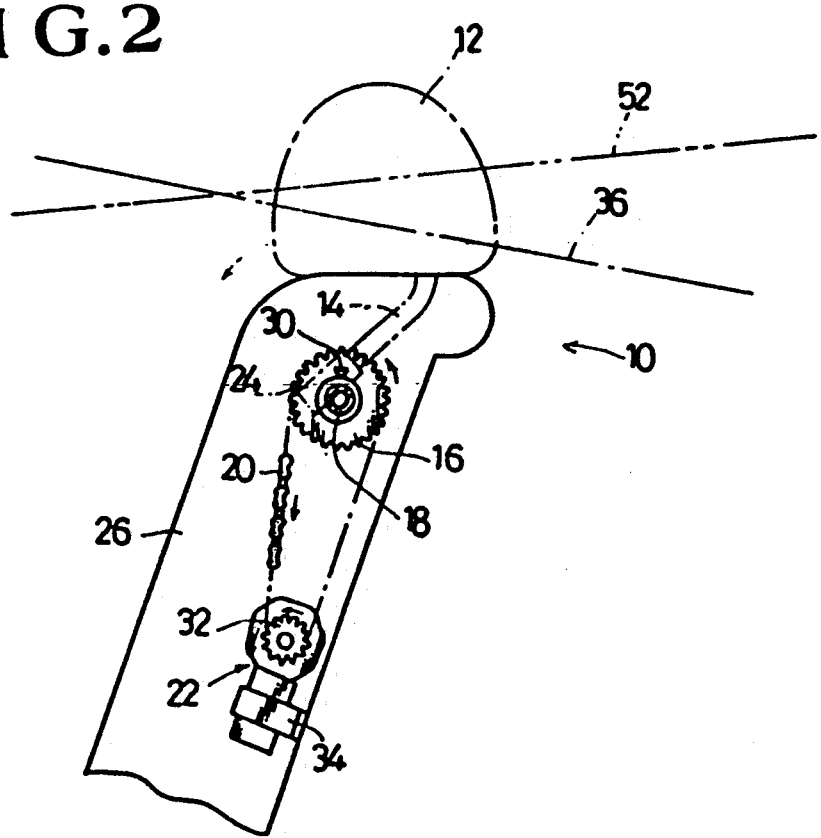
FIG. 2 is a longitudinally sectional view of the headrest, which shows the state wherein the headrest is located at a use position.

As shown in FIGS. 1 and 2, in the shown headrest designated by (10) which is a movable type, its headrest body (12) is fixed upon a shaft (18) via a pair of stays (14)(14), the shaft (18) being provided with a first sprocket (16) at its one end, and the first sprocket (16) is operatively connected via an endless chain (20) with a second sprocket (32) fixed to a drive shaft of a motor (22). As shown, the second sprocket (32) is small in diameter with respect to the first sprocket (16).

Thus, as will become apparent later, when the motor (22) is worked, the headrest body (12) is rotated between a head support use position and non-use position, as can be seen from FIGS. 2 and 3. The headrest body (12), when displaced at the use position, stands ready to receive or support the head of an occupant on the seat.

As shown in FIG. 1, the shaft (18) is provided with a pair of stay holders (24)(24) which respectively receive and support the two stays (14)(14), such that the holders (24)(24) are rotatable with the rotation of the shaft (18) which are extended rotatably between a pair of support brackets (28)(28). The support brackets (28)(28) are fixedly mounted within a seat back (26). Respectively inserted into the two stay holders (24)(24), are the lower end parts respectively of the stays (14)(14) and the latter (14)(14) are fixed to the former (24)(24), whereupon the headrest body (14) is mounted upon the top of the seat back (26). With such structure, it is seen that the headrest body (14) is to be rotated about the axis of the shaft (13) in a fore-and-aft direction relative to the seat back (26).

Figure 4:
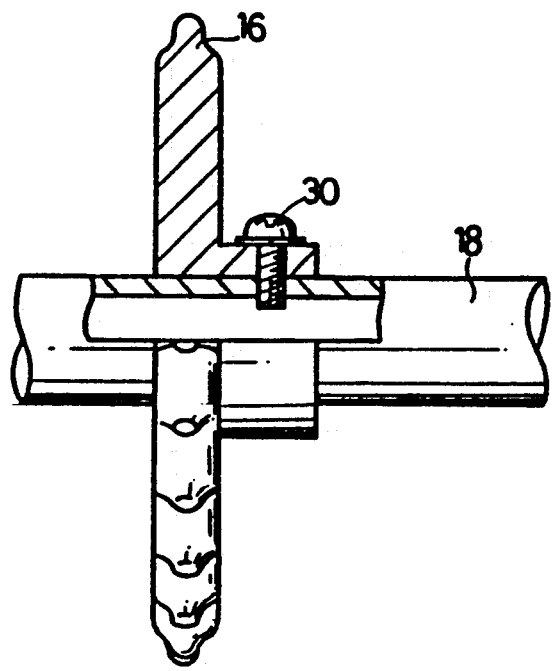
FIG. 4 is a partially broken side view of the first sprocket.

The first sprocket (16) is, as in FIG. 4, fixed integrally to the shaft (18) by means of a securing screw (30) so that the sprocket (16) per se is to be rotated with the rotation of the shaft (18).

The endless chain (20) is at its upper end part wound about the first sprocket (16) and at its lower end part wound about the second sprocket (32), so as to permit a rotative drive force of the motor (22) to be transmitted to the shaft (18).

As stated above, the diameter of the second sprocket (32) is small as compared with that of the first one (16), which is effective in eliminating an irregularity occurring in the rotation of the second sprocket (32) due to a certain irregular rotation of the motor (22), and thus advantageously such dimensional difference between the first and second sprockets (16)(32) serves to avoid the imparting of such irregularity towards the shaft (18). The motor (22) is fixed within the seat back (26) by means of a bracket (34), such that, as shown, the motor (22) is disposed at the lower part of the lateral side of the seat back (26).

Accordingly, with the motor (22) worked, the second sprocket (32) is rotated to cause the cyclic movement of the endless chain (20) over those particular second and first sprockets (32)(16), whereby the rotation of the first sprocket (16) due to such movement of the endless chain (20) causes simultaneous rotation of the shaft (28), with the chain (20) being cycled in the vicinity of and along the lateral inner wall of the seat back (26), with the result that the headrest body (12) is caused to rotate in a direction identical to the direction of the rotation produced by the motor (22).

It is appreciated that a cushion member (not shown) provided in the seat back (26) is free to be deflected at its central portion without contact with the motor (22), thus avoiding a hard strange touch of the motor (22) and other associated mechanical elements, i.e., the chain (20) and two sprockets (32) (16). Further, the number of transmitting elements is reduced and there is eliminated wobbling among the mechanical elements and an irregular rotation occurred thereby is almost completely avoided, and the engagement between the chain (20) and sprockets (32)(16) assured to avoid any wobble therein, so as to allow a precise transmission of the drive force of the motor (22) to the shaft (18).

In this connection, it is preferable that the motor (22) should be provided with a worm gear, because it serves as a brake means for preventing the drive shaft of the motor (22), when not at work, against unrequired rotation, thereby insuring the precise positioning of the headrest body (12) at a desired point.

Although not shown, the motor (22) is electrically connected via an ignition switch with a battery so that the motor (22) is to be worked by operating the ignition switch as a main switch through the battery as a power source. Further, though not shown, the operation of the motor (22) is controlled by a driver through a control switch, which is disposed at a console box, an armrest, or anywhere the switch is placed within reach of the driver. As such control switch, a self-return type, seesaw switch with a memory means can be used. As with this kind of movable headrest, it is preferable that a central processing unit is incorporated therein, which processes a signal from the control switch and sends a proper control signal to the motor (22) or other associated mechanical elements, and with such CPU control system, the motor (22) is controlled in its operation for a proper motion of the headrest body (22). As a means for stopping the motor (22), it is preferable that a pressing-type limit switch is provided and a stopper is fixed at the shaft (18) such that with rotation of the shaft (18), the stopper is to depress the limit switch to thereby limit the drive rotation range of the motor (22).

Now, referring to FIG. 2, when the control switch is operated to instruct the motor (22) to drive to cause the headrest body (12) to rotate downwardly as indicated by the arrow from the use position to a non-use position (see FIG. 3), the second sprocket (32) is caused to rotate in a counterclockwise direction as in the arrow, and simultaneously the first sprocket (16) is caused via the endless chain (20) to rotate, which also simultaneously causes the rotation of the shaft (]8) in the same counterclockwise direction. Then, the headrest body (12) is rotated about the axis of the shaft (18), which forms a rotation center of the headrest body (12), in a direction towards the non-use position. Then, as shown in FIG. 3, the headrest body (12) is displaced to the non-use position forwardly of the seat back (26) and thus located down away from a driver's backward view field line (36). The headrest body (12) is stopped by means of the foregoing limit switch at a given non-use position.

Reversely, when the control switch is operated to instruct the motor (22) to cause the headrest body (12) to rotate upwardly as indicated by the arrow from the non-use position to the foregoing use position, the second sprocket (32) is caused to rotate in a clockwise direction as in the arrow, and simultaneously the first sprocket (16) is caused via the endless chain (20) to rotate, thereby causing the simultaneous rotation of the shaft (18) in the same clockwise direction. Then, the headrest body (12) is rotated together with the shaft (18) in a direction towards the use position. Consequently, as shown in FIG. 2, the headrest (12) is returned to the use position upon the top of the seat back (26), and located there as the motor (22) is ceased in its drive by means of the limit switch.

Figure 5:
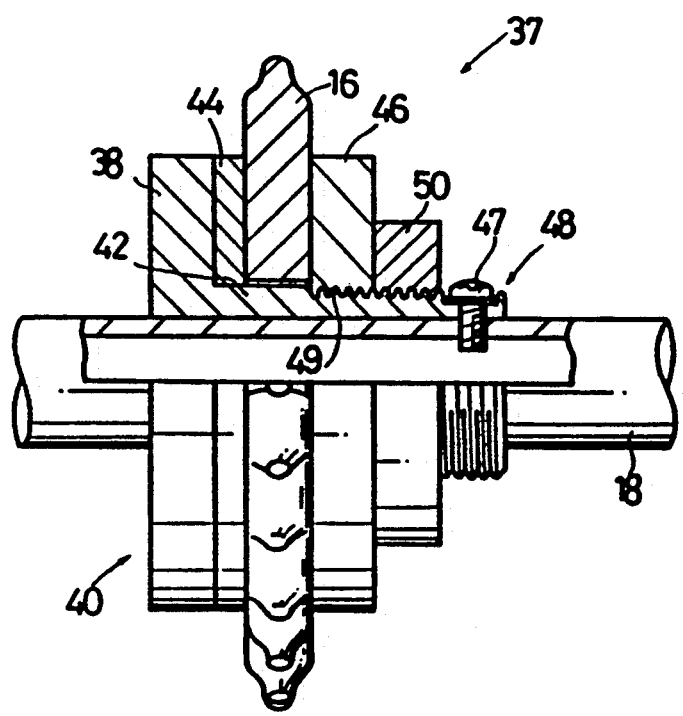
FIG. 5 is a partially broken side view of the first sprocket and a torque limit means.

FIG. 5 illustrates an embodiment in which there is provided a torque limit means (37) at the first sprocket (16) and shaft (18). In this embodiment, the first sprocket (16) is not directly fixed on the shaft (18) and connected thereto via the torque limit means (37) in an interlocking manner.

As shown in FIG. 5, the torque limit means (37) includes a hub (40) in which are provided a tubular member (42) and a flange (38) integral therewith, and a pair of friction plates (44)(46) fixed on the tubular member (42). The hub (40) is fixed on the shaft (18) by means of a securing screw (47). The first sprocket (16) is rotatably supported on the tubular member (42) and interposed between the two friction plates (44)(46). Hence, the two friction plates (44)(46) sandwich the first sprocket (16). the friction plate (44) is fixed at the inner surface of the flange (38) integrally. The other friction plate (46) is formed in its center hole with a female threaded portion (49) which is threadedly engaged with the a male threaded portion (48) formed circumstantially of the rearward area of the tubular member (42). The latter friction plate (46) is prevented against removal from the hub (40) by means of a lock nut (50) which is threadedly engaged with the male threaded portion (48) in a fixed way, so as to avoid an accidental removal of the friction plate (46) from the tubular member (42) outwardly therefrom.

With those friction plates (44)(46), the first sprocket (16) is rotated together with the shaft (18) via the hub (40) fixed thereon. The friction plates (44)(46) are not limited to the above-stated construction, but may be fixed to the hub (40) in any other suitable manner.

By virtue of such frictional limit means, the headrest body (12) may be forcibly roted about the shaft (18) by manually applying thereto a manual force overcoming the frictional force of the friction plates (44)(46) exerted upon the first sprocket (16), because in such case, with the manual rotation of the shaft (18), the friction plates (44)(46) are caused to rotate slidingly along both sides of the first sprocket (16). In other words, in the case, for example, where in a sudden failure of the motor (22) the headrest body (12) is stopped and unmoved at the non-use position, an occupant on the seat may forcibly return the headrest body (12) to the use position, with his or her hands, so that the headrest body (12) in such accident may not be a hindrance against the entry of the occupant into the seat and the occupant may use the headrest (12) in an ordinary way. In this connection, it is desirable that a stopper means be equipped in the seat back (26), which is adapted for limiting the maximum rearward rotation range of the headrest body (12), whereby in forcibly returning the headrest body (12) to the use position, the occupant may place the headrest body (12) at a given use position.

Figure 3:
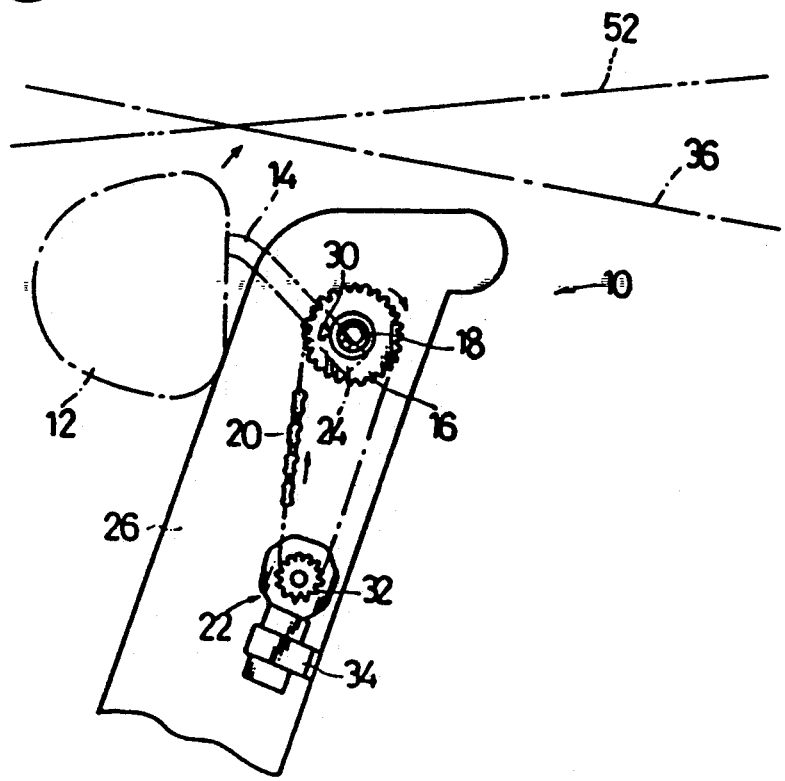
FIG. 3 is a longitudinally sectional view of the headrest, which shows the state wherein the headrest is located at a non-use position.

The above description has been made to the rear seat, but the present invention may be applied to an auxiliary seat next to a driver's seat, in which case, the headrest body (12) can be displaced downwardly away from the driver's forward view field line indicated by a two-dotted chain line in FIG. 3, and therefore, the driver can attain a wide and clear forward view field.

While having described the present invention as above, it should be understood that the above embodiments are not limitative, but the invention may be modified in any other forms, and other various replacements and additions may structurally be possible without departing from the spirit and scope of the appended claims.

What is claimed is:

1. A headrest, which is provided on a seat back of a seat, comprising:
   a pair of spaced support brackets fixed within said seat back;
   a shaft which is rotatably extended between said pair of support brackets, said shaft being provided with a first sprocket;
   a headrest body which is fixed via a stay to said shaft;
   a motor fixed in said seat back, said motor being disposed at a lower part of a lateral side of said seat back and having a second sprocket; and
   an endless chain extended between said first and second sprockets,
   wherein an operation of said motor causes cyclic movement of said endless chain to rotate said shaft, thereby displacing said headrest body in a direction forwardly and backwardly relative to said seat back.

2. The headrest as claimed in claim 1, wherein said first sprocket is fixed to said shaft via a torque limit means.

3. The headrest as claimed in claim 2, wherein said torque limit means includes a pair of friction plates which are rotatable together with said shaft, and wherein said first sprocket is interposed between said pair of friction plates in a frictional way such that said first sprocket is rotatable about said shaft.

* * * * *